US008614271B2

(12) United States Patent  
Davis et al.

(10) Patent No.: US 8,614,271 B2
(45) Date of Patent: Dec. 24, 2013

(54) PROPYLENE-ALPHA-OLEFIN POLYMERS, HOT MELT ADHESIVE COMPOSITIONS THAT INCLUDE PROPYLENE-ALPHA-OLEFIN POLYMERS AND ARTICLES THAT INCLUDE THE SAME

(75) Inventors: Kevin Davis, North St. Paul, MN (US); Sharf U. Ahmed, Woodbury, MN (US); Stephen M. Willging, Minneapolis, MN (US); Richard A. Miller, White Bear Lake, MN (US); Peter Simone, St. Paul, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

(21) Appl. No.: 13/529,244

(22) Filed: Jun. 21, 2012

(65) Prior Publication Data

US 2013/0005884 A1  Jan. 3, 2013

Related U.S. Application Data

(60) Provisional application No. 61/501,578, filed on Jun. 27, 2011.

(51) Int. Cl.  
*C08L 91/06* (2006.01)

(52) U.S. Cl.  
USPC .......................................... 524/487; 524/489

(58) Field of Classification Search  
USPC ................................................ 524/487–489  
See application file for complete search history.

(56) References Cited

U.S. PATENT DOCUMENTS

| 3,539,481 | A | 11/1970 | Parker |
| 3,862,265 | A | 1/1975 | Steinkamp et al. |
| 3,882,194 | A | 5/1975 | Krebaum et al. |
| 3,987,122 | A | 10/1976 | Bartz et al. |
| 4,105,718 | A | 8/1978 | Weemes et al. |
| 4,112,208 | A | 9/1978 | McConnell et al. |
| 4,120,916 | A | 10/1978 | Meyer, Jr. et al. |
| 4,140,733 | A | 2/1979 | Meyer et al. |
| 4,217,428 | A | 8/1980 | McConnell et al. |
| 4,477,532 | A | 10/1984 | Schmukler et al. |
| 4,506,056 | A | 3/1985 | Gaylord |
| 4,567,223 | A | 1/1986 | Ames |
| 4,906,690 | A | 3/1990 | Hasenbein et al. |
| 5,041,482 | A | 8/1991 | Ornsteen et al. |
| 5,041,484 | A | 8/1991 | Atwell et al. |
| 5,185,398 | A | 2/1993 | Kehr et al. |
| 5,241,014 | A | 8/1993 | Kehr et al. |
| 5,302,675 | A | 4/1994 | Sustic et al. |
| 5,441,999 | A | 8/1995 | Jarvis et al. |
| 5,455,111 | A | 10/1995 | Velasquez Urey |
| 5,468,807 | A | 11/1995 | Tsurutani et al. |
| 5,534,575 | A | 7/1996 | Foster et al. |
| 5,637,410 | A | 6/1997 | Bonner et al. |
| 5,723,546 | A | 3/1998 | Sustic et al. |
| 5,783,629 | A | 7/1998 | Srinivasan et al. |
| 5,955,547 | A | 9/1999 | Roberts et al. |
| 5,986,009 | A | 11/1999 | Thoen et al. |
| 6,080,818 | A | 6/2000 | Thakker et al. |
| 6,100,351 | A | 8/2000 | Sun et al. |
| 6,107,430 | A | 8/2000 | Dubios et al. |
| 6,143,825 | A | 11/2000 | Beren et al. |
| 6,184,327 | B1 | 2/2001 | Weng et al. |
| 6,248,832 | B1 | 6/2001 | Peacock |
| 6,395,791 | B1 | 5/2002 | Chaudhary et al. |
| 6,448,333 | B1 | 9/2002 | Rodriguez et al. |
| 6,475,633 | B1 | 11/2002 | Robert et al. |
| 6,552,110 | B1 | 4/2003 | Yalvac et al. |
| 6,573,350 | B1 | 6/2003 | Markel et al. |
| 6,653,385 | B2 | 11/2003 | Wang et al. |
| 6,656,601 | B1 | 12/2003 | Kawachi et al. |
| 6,747,114 | B2 | 6/2004 | Karandinos et al. |
| 6,797,774 | B2 | 9/2004 | Kijima |
| 6,872,279 | B1 | 3/2005 | Kolowrot et al. |
| 6,936,635 | B1 | 8/2005 | Da Silva |
| 6,960,635 | B2 | 11/2005 | Stevens et al. |
| 7,067,585 | B2 | 6/2006 | Wang et al. |
| 7,223,814 | B2 | 5/2007 | Martin et al. |
| 7,232,871 | B2 | 6/2007 | Datta et al. |
| 7,262,251 | B2 | 8/2007 | Kanderski et al. |

(Continued)

FOREIGN PATENT DOCUMENTS

| DE | 102008019802 A1 | 10/2009 |
| EP | 0 442 045 A2 | 8/1991 |
| EP | 442045 B1 | 10/1993 |
| EP | 1 477 499 | 11/2004 |
| EP | 1 498 432 | 1/2005 |
| EP | 2 050 770 | 4/2009 |
| EP | 2 253 648 | 11/2010 |
| EP | 1 833 939 | 3/2011 |
| EP | 2 281 859 | 9/2011 |
| GB | 1 267 472 | 4/1970 |

(Continued)

OTHER PUBLICATIONS

Eastman product literature entitled, "Epolene Waxes as Petroleum Wax Modifiers" (Jul. 1997) (10 pages).  
Rextac MSDS RT2765 CS212 (Feb. 14, 2011) (4 pages).  
Rextac Product Specifications, http://www.rextac.com/index.php?q=node/21, (1 page).

(Continued)

*Primary Examiner* — Peter Szekely  
(74) *Attorney, Agent, or Firm* — Kirsten Stone; Allison Johnson

(57) ABSTRACT

A propylene-alpha-olefin polymer that includes at least 50% by weight propylene, has a ratio of z average molecular weight (Mz) to number average molecular weight (Mw) (Mz/Mw) from greater than 20 to no greater than 50, and a ratio of Mz to weight average molecular weight (Mw) (Mz/Mw) of greater than 2.5, and exhibits a viscosity of no greater than 2,500 centipoise at 190° C., and a hot melt adhesive composition that includes the propylene-alpha-olefin polymer, a first wax consisting of a functionalized wax, and a second wax different from the first wax, the adhesive composition exhibiting a viscosity of no greater than 2,500 centipoise at 177° C.

39 Claims, No Drawings

(56) References Cited

U.S. PATENT DOCUMENTS

| | | |
|---|---|---|
| 7,294,681 B2 | 11/2007 | Jiang et al. |
| 7,309,747 B2 | 12/2007 | Minami et al. |
| 7,408,007 B2 | 8/2008 | Roberts et al. |
| 7,459,503 B2 | 12/2008 | Kanamaru et al. |
| 7,517,579 B2 | 4/2009 | Campbell et al. |
| 7,521,507 B2 | 4/2009 | Lewtas et al. |
| 7,524,910 B2 | 4/2009 | Jiang et al. |
| 7,541,402 B2 | 6/2009 | Abhari et al. |
| 7,550,528 B2 | 6/2009 | Abhari et al. |
| 7,683,134 B2 | 3/2010 | Roberts et al. |
| 7,700,707 B2 | 4/2010 | Abhari et al. |
| 7,750,078 B2 | 7/2010 | Curry |
| 7,770,707 B2 | 8/2010 | Brees et al. |
| 7,786,032 B2 | 8/2010 | Zhou et al. |
| 7,812,085 B2 | 10/2010 | Tse et al. |
| 7,968,665 B2 | 6/2011 | Minami et al. |
| 8,076,407 B2 | 12/2011 | Ellis et al. |
| 8,242,198 B2 | 8/2012 | Jiang et al. |
| 8,263,707 B2 | 9/2012 | Datta et al. |
| 2002/0007033 A1 | 1/2002 | Karandinos et al. |
| 2002/0127389 A1 | 9/2002 | Hanada et al. |
| 2003/0096896 A1 | 5/2003 | Wang et al. |
| 2003/0181554 A1 | 9/2003 | Faissat et al. |
| 2004/0220320 A1* | 11/2004 | Abhari et al. ............ 524/487 |
| 2006/0020067 A1* | 1/2006 | Brant et al. ............. 524/236 |
| 2007/0028118 A1 | 2/2007 | Brown et al. |
| 2007/0042193 A1 | 2/2007 | Wang |
| 2007/0281118 A1 | 12/2007 | Miller et al. |
| 2008/0081868 A1* | 4/2008 | Jiang et al. ............. 524/487 |
| 2009/0105407 A1 | 4/2009 | Karjala et al. |
| 2009/0203847 A1 | 8/2009 | Ellis et al. |
| 2009/0306281 A1 | 12/2009 | Tancrede et al. |
| 2010/0059178 A1 | 3/2010 | Jiang et al. |
| 2010/0132886 A1* | 6/2010 | Rodriguez et al. ........ 156/334 |
| 2010/0305259 A1 | 12/2010 | Rodriguez et al. |
| 2011/0054117 A1 | 3/2011 | Hall |
| 2011/0076905 A1 | 3/2011 | Mussig et al. |
| 2011/0229729 A2 | 9/2011 | Laiho et al. |
| 2012/0171466 A1 | 7/2012 | Urbach et al. |

FOREIGN PATENT DOCUMENTS

| | | |
|---|---|---|
| WO | WO95/10575 | 4/1995 |
| WO | WO-95/10575 | 4/1995 |
| WO | WO-98-03603 | 1/1998 |
| WO | WO-98/42780 | 10/1998 |
| WO | WO-99/20664 | 4/1999 |
| WO | WO-99-20701 | 4/1999 |
| WO | WO-00/00520 | 1/2000 |
| WO | WO-00/01745 | 1/2000 |
| WO | WO-00-37514 | 6/2000 |
| WO | WO-01-46278 | 6/2001 |
| WO | WO-03-033612 | 4/2003 |
| WO | WO-03-37514 | 5/2003 |
| WO | WO2005/100501 | 10/2005 |
| WO | WO2005/105941 | 11/2005 |
| WO | WO-2005-111132 AI | 11/2005 |
| WO | WO2006069205 | 6/2006 |
| WO | WO2007/002177 | 1/2007 |
| WO | WO2007/142749 | 12/2007 |
| WO | WO-2010-132886 | 11/2010 |
| WO | WO-2011-022523 A2 | 2/2011 |
| WO | WO2011/059431 | 5/2011 |
| WO | WO-2012/068576 | 7/2012 |

OTHER PUBLICATIONS

Rextac RT2115 product data sheet (Apr. 1998) (1 page).
Rextac RT2730 product data sheet (Apr. 1998) (1 page).
Rextac RT2780 product data sheet (Apr. 1998) (1 page).
Rextac RT2788 product data sheet (Sep. 2010) (1 page).

* cited by examiner

PROPYLENE-ALPHA-OLEFIN POLYMERS, HOT MELT ADHESIVE COMPOSITIONS THAT INCLUDE PROPYLENE-ALPHA-OLEFIN POLYMERS AND ARTICLES THAT INCLUDE THE SAME

CROSS-REFERENCE TO RELATED APPLICATIONS

This application claims the benefit of U.S. Provisional Application No. 61/501,578 filed Jun. 27, 2011, which is incorporated herein.

BACKGROUND

The invention is directed to forming propylene-alpha-olefin polymers and formulating propylene-alpha-olefin polymer-based hot melt adhesive compositions.

It is important that adhesives used in packaging applications exhibit good bond strength over a wide temperature range and fast set times.

Hot melt adhesive compositions that are formulated with amorphous polypropylene polymers are useful in a variety of applications. Many amorphous polypropylene polymers exhibit a long open time, are quite tacky immediately after solidifying from a molten state and remain tacky for an undesirable period of time after solidifying. These properties are undesirable for applications that require short open times and non-tacky properties after solidification.

SUMMARY

In one aspect, the invention features a hot melt adhesive composition that includes a propylene-alpha-olefin polymer comprising at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw) from greater than 2.5 to no greater than 6, a crystallinity of at least 5%, and a viscosity of no greater than 2,500 centipoise at 190° C., a first wax consisting of a functionalized wax, and a second wax different from the first wax, the adhesive composition exhibiting a viscosity of no greater than 2,500 centipoise at 177° C. In some embodiments, the propylene-alpha-olefin polymer is a propylene-butene copolymer.

In another aspect, the invention features a hot melt adhesive composition that includes a propylene-mono-alpha-olefin polymer having a ratio of weight average molecular weight (Mw) to number average molecular weight (Mn) (Mw/Mn) of at least 6 and a crystallinity of at least 5%, a first wax consisting of a functionalized wax, and a second wax different from the first wax, the adhesive composition exhibiting a viscosity of no greater than 2,500 centipoise at 177° C. and at least 40% fiber tear at +60° C., and having a z average molecular weight (Mz) of no greater than 120,000.

In other aspects, the invention features a hot melt adhesive composition that includes a modified propylene-mono-alpha-olefin polymer, a first wax consisting of a functionalized wax, and a second wax different from the first wax, the adhesive composition exhibiting a viscosity of no greater than 2,500 centipoise at 177° C., and having a z average molecular weight (Mz) of no greater than 120,000. In one embodiment, the modified propylene-mono-alpha-olefin polymer is the reaction product of a propylene-mono-alpha-olefin polymer and free radical initiator.

In some embodiments, the adhesive composition forms a fiber tearing bond at −29° C. and at +60° C. In other embodiments, the adhesive composition exhibits at least 50% fiber tear at −29° C. and at +60° C. In another embodiments, the adhesive composition exhibits a set time of no greater than 15 seconds. In one embodiment, the adhesive composition exhibits a set time of no greater than 10 seconds.

In other embodiments, the adhesive composition has a Mz of no greater than 120,000.

In another embodiment, the propylene-alpha-olefin polymer has a Mz of no greater than 150,000.

In other embodiments, the propylene-alpha-olefin polymer is derived from propylene and a mono-alpha-olefin. In some embodiments, the propylene-alpha-olefin polymer is derived from propylene and an alpha-olefin selected from the group consisting of ethylene, butene, pentene, hexene, heptene, octene, nonene, decene, dodecene, 4-methyl-pentene-1,3-methyl pentene-1,3,5,5-trimethyl-hexene-1,5-ethyl-1-nonene, and combinations thereof. In one embodiment, the propylene-alpha-olefin polymer includes butene. In another embodiment, the propylene-alpha-olefin polymer is derived from a propylene-alpha-olefin polymer having an Mz of at least 200,000. In some embodiments, the propylene-alpha-olefin polymer is derived from a propylene-alpha-olefin polymer having a viscosity no greater than 10,000 centipoise at 190° C. In other embodiments, the propylene-alpha-olefin polymer is derived from a propylene-alpha-olefin polymer having a viscosity no greater than 8,000 centipoise at 190° C.

In one embodiment, the modified polymer has a heat of fusion of no greater than 30 J/g. In other embodiments, the modified polymer has a heat of fusion of no greater than 20 J/g.

In another embodiment, hot melt adhesive composition has a viscosity of no greater than 2,000 centipoise at 177° C.

In other embodiments, the polymer has a glass transition temperature (Tg) of less than −20° C.

In some embodiments, the functionalized wax includes maleic anhydride functionalized wax. In other embodiments, the functionalized wax includes maleic anhydride functionalized polyolefin wax. In another embodiment, the functionalized wax includes maleic anhydride functionalized polypropylene wax. In other embodiments, the second wax is selected from the group consisting of polyethylene wax, polypropylene wax, and Fischer Tropsch wax. In one embodiment, the functionalized wax includes maleic anhydride functionalized polypropylene wax and the second wax includes polyethylene wax. In another embodiment, the hot melt adhesive composition includes at least 1% by weight of the functionalized wax. In other embodiments, the hot melt adhesive composition includes at least about 5% by weight of the second wax. In some embodiments, the hot melt adhesive composition includes at least about 10% by weight of the second wax. In other embodiments, hot melt adhesive composition includes no greater than about 30% by weight non-functionalized wax.

In one embodiment, the hot melt adhesive composition includes at least about 60% of the propylene-alpha-olefin polymer. In other embodiments, the hot melt adhesive composition includes at least about 60% of the propylene-alpha-olefin polymer. In some embodiments, the hot melt adhesive composition includes at least about 70% of the propylene-alpha-olefin polymer.

In other embodiments, the hot melt adhesive composition includes at least about 2% of the functionalized wax and at least about 5% of the second wax.

In some embodiments, the Mz/Mw is no greater than 5. In other embodiments, the Mz is no greater than 100,000.

In some embodiments, the adhesive composition is free of tackifying agent. In other embodiments, the adhesive composition includes tackifying agent. In one embodiment, the adhesive composition includes at least 15% by weight tackifying agent. In another embodiment, the adhesive composition includes from 15% by weight to about 30% by weight tackifying agent.

In another aspect, the invention features a hot melt adhesive composition that includes a modified propylene-mono-alpha-olefin polymer that includes the reaction product of a propylene-mono-alpha-olefin polymer and a free radical initiator, the propylene-mono-alpha-olefin polymer having a Mz/Mn of greater than 45, a Mz/Mw of greater than 3.2, and a viscosity of from at least 1,000 centipoise to no greater than 10,000 centipoise at 190° C., a first wax consisting of a functionalized wax, and a second wax different from the first wax, the adhesive composition exhibiting a viscosity of no greater than 2,500 centipoise at 177° C. and an Mz no greater than 120,000. In one embodiment, the propylene-mono-alpha-olefin polymer has an Mz of at least 140,000.

In other aspects, the invention features a propylene-alpha-olefin polymer that includes at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw) from greater than 2.5 to no greater than 6, a crystallinity of at least 5%, and a viscosity of no greater than 2,500 centipoise at 190° C.

In another aspect, the invention features a method of modifying a propylene-alpha-olefin polymer, the method including reacting a propylene-alpha-olefin polymer that includes at least 50 mole % propylene, a ratio of z average molecular weight (Mz) to number average molecular weight (Mn) (Mz/Mn) of greater than 20, and a ratio of Mz to weight average molecular weight (Mw) (Mz/Mw) of greater than 3.0, and a free radical initiator to form a propylene-alpha-olefin polymer that includes at least 50 mole % propylene, a ratio of z average molecular weight (Mz) to number average molecular weight (Mn) (Mz/Mn) from greater than 20 to no greater than about 50, a ratio of Mz to weight average molecular weight (Mw) (Mz/Mw) from greater than 2.5 to no greater than 6, and a viscosity of no greater than 2,500 centipoise at 190° C. In one embodiment, the reaction occurs in the absence of wax and additional polymers.

In other aspects, the invention features a modified propylene-alpha-olefin polymer that includes the reaction product of a propylene-alpha-olefin polymer that includes at least 50 mole % propylene, a ratio of z average molecular weight (Mz) to number average molecular weight (Mn) (Mz/Mn) of greater than 20, and a ratio of Mz to weight average molecular weight (Mw) (Mz/Mw) of greater than 3.0, and a free radical initiator, the modified propylene-alpha-olefin polymer comprising at least 50 mole % propylene, a ratio of z average molecular weight (Mz) to number average molecular weight (Mn) (Mz/Mn) from greater than 20 to no greater than about 50, a ratio of Mz to weight average molecular weight (Mw) (Mz/Mw) from greater than 2.5 to no greater than 6, and a viscosity of no greater than 2,500 centipoise at 190° C.

In other aspects, the invention features a method of making a hot melt adhesive composition that includes combining a propylene-alpha-olefin polymer that includes at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw) from greater than 2.5 to no greater than 6, a crystallinity of at least 5%, and a viscosity of no greater than 2,500 centipoise at 190° C., a first wax consisting of a functionalized wax, and a second wax different from the first wax, the adhesive composition exhibiting a viscosity of no greater than 2,500 centipoise at 177° C.

The invention features a propylene-alpha-olefin polymer that has a relatively high z average molecular weight, a relatively low viscosity, and is useful in hot melt adhesive compositions.

The invention also features a hot melt adhesive composition that exhibits a relatively short open time and good fiber tearing properties over a wide temperature range.

Other features and advantages will be apparent from the following description of the preferred embodiments and from the claims.

GLOSSARY

In reference to the invention, these terms have the meanings set forth below:

The term consisting essentially of in reference to a hot melt adhesive composition means the hot melt adhesive composition does not include any other component that increases the fiber tear properties of the adhesive composition.

The term "modified propylene-alpha-olefin polymer" means a propylene-alpha-olefin polymer that is the reaction product of a propylene-alpha-olefin polymer and a free radical initiator.

The term "wax" means a polymer having crystallinity and a weight average molecular weight (Mw) less than 20,000 g/mole.

For ease of reference, when a polymer is referred to as including or comprising an olefin, the term "olefin" refers to the polymerized form of the olefin in the polymer.

DETAILED DESCRIPTION

Propylene-Alpha-Olefin Polymer

The propylene-alpha-olefin polymer exhibits a viscosity of no greater than 2,500 cps, no greater than 2,000 cps, or even no greater than 1,500 cps, at 190° C., a Mz/Mn of greater than 20, greater than 25, greater than 30, or even from about 20 to about 50, and a Mz/Mw of at least 2.5, at least 2.8, at least 3M, no greater than 6, no greater than 5.5, no greater than 5, or even no greater than 4.5. The propylene-alpha-olefin polymer also preferably exhibits a glass transition temperature (Tg) of less than –10° C., less than –20° C., or even less than –30° C. The propylene-alpha-olefin polymer can be tacky or nontacky at room temperature.

Useful propylene-alpha-olefin polymers exhibit a number average molecular weight (Mn) of at least about 1,000 g/mole, no greater than about 10,000 g/mole, or even no greater than about 8,000 g/mole, a weight average molecular weight (Mw) of no greater than 50,000 g/mole, no greater than 40,000 g/mole, at least 15,000 g/mole, or even at least 10,000 g/mole, and a z average molecular weight (Mz) of no greater than 200,000 g/mole, no greater than 175,000 g/mole, no greater than 150,000 g/mole, no greater than 120,000 g/mole, no greater than 100,000 g/mole, or even no greater than 90,000 g/mole.

Useful propylene-alpha-olefin polymers also exhibit a crystallinity of at least 5%, at least about 10%, or even no greater than about 30%, and a heat of fusion of no greater than 60 J/g, no greater than 30 J/g, or even no greater than 20 J/g.

The propylene-alpha-olefin polymer preferably is free of functional groups but optionally includes functional groups (e.g., maleic anhydride modified propylene-alpha-olefin polymer). The propylene-alpha-olefin polymer also preferably has an acid number of zero.

Useful propylene-alpha-olefin polymers include, e.g., homopolymers, copolymers (i.e., copolymers, terpolymers, and higher order polymers), and combinations thereof, and are derived from propylene and an alpha-olefin having at least two carbon atoms, at least three carbon atoms, at least four carbon atoms, and combinations thereof. Useful alpha-olefins include, e.g., ethylene, propylene, butene, pentene, hexene, heptene, octene, nonene, decene, dodecene, 4-methyl-pentene-1,3-methyl pentene-1,3,5,5-trimethyl-hexene-1,5-ethyl-1-nonene, and combinations thereof. Suitable alpha-olefin comonomers include mono-alpha olefins (i.e., one unsaturated double bond) and higher order olefins (e.g., a di-olefin, e.g., 1,9-decadiene).

The propylene-alpha-olefin polymer preferably includes at least 50 mole %, at least about 60 mole %, no greater than about 80 mole %, or even from about 50 mole % to about 70 mole % propylene, and at least 2 mole %, at least about 5 mole %, at least about 10 mole %, at least about 20 mole %, at least about 30 mole %, no greater than about 50 mole %, or even from about 20 mole % to about 50 mole % of at least one alpha-olefin comonomer.

The propylene-alpha-olefin polymer preferably is a modified propylene-alpha-olefin polymer having the properties set forth above. A modified propylene-alpha-olefin polymer is a propylene-alpha-olefin polymer that has been treated with a free radical initiator such that the viscosity and z average molecular weight of the modified propylene-alpha-olefin polymer are less than the viscosity and z average molecular weight of the propylene-alpha-olefin polymer prior to modification. The propylene-alpha-olefin polymer from which the modified propylene-alpha-olefin polymer is derived is referred to herein as the unmodified propylene-alpha-olefin polymer. The modified propylene-alpha-olefin polymer preferably exhibits a viscosity that is at least 25% less than, at least 30% less than, or even at least 35% less than the viscosity of the starting (i.e., unmodified) propylene-alpha-olefin polymer, an Mz that is at least 25% less than, at least 30% less than, or even at least 35% less than the Mz of the starting polymer and an Mz/Mn that is at least 25% less than, at least 30% less than, or even at least 35% less than less than the Mz/Mn of the starting polymer.

Useful propylene-alpha-olefin polymers from which the modified propylene-alpha-olefin polymer can be derived preferably exhibit a viscosity of at least about 1,500 cps, no greater than about 50,000 cps, no greater than about 20,000 cps, no greater than about 10,000 cps, no greater than about 8,000 cps, no greater than about 6,000 cps, from about 1,500 cps to about 20,000 cps, or even from about 2,500 cps to about 10,000 cps, at 190° C., a Mz/Mn of at least 40, greater than 45, greater than 50, or even greater than 55, and a Mz/Mw of at least 3.2, at least 4, or even at least 5. The unmodified propylene-alpha-olefin polymer preferably exhibits a glass transition temperature (Tg) of less than −10° C., less than −20° C., or even less than −30° C.

Useful unmodified propylene-alpha-olefin polymers exhibit a number average molecular weight (Mn) of at least about 1,000 g/mole, no greater than about 10,000 g/mole, or even no greater than about 5,000 g/mole, a weight average molecular weight (Mw) of no greater than 100,000 g/mole, at least about 15,000 g/mole, or even at least about 20,000 g/mole, and a z average molecular weight (Mz) of no greater than 300,000 g/mole, no greater than about 250,000 g/mole, no greater than about 200,000 g/mole, no greater than about 175,000 g/mole, or even no greater than about 150,000 g/mole.

Useful unmodified propylene-alpha-olefin polymers also exhibit a crystallinity of at least 5%, at least about 10%, or even no greater than about 30%, and a heat of fusion of no greater than 60 J/g, no greater than 30 J/g, or even no greater than 20 J/g.

Useful unmodified propylene-alpha-olefin polymers are commercially available under a variety of trade designations including, e.g., the REXTAC RT 2000 series of trade designations from REXTAC LLC (Odessa, Tex.), including REXTAC RT 2765 propylene butene copolymer, REXTAC RT 2788 propylene-butene copolymer, REXTAC RT 2780 propylene-butene copolymer, REXTAC RT 2215 propylene-ethylene copolymer, REXTAC RT 2385 propylene-ethylene copolymer, REXTAC RT 2535 propylene-ethylene copolymer, and REXTAC RT 2585 propylene-ethylene copolymer, the EASTOFLEX series of trade designations from Eastman Chemical Co. (Kingsport, Tenn.) including EASTOFLEX E1060 propylene-ethylene copolymer, and the VESTOPLAST series of trade designations from Evonik Industries (Marl, Germany) including VESTOPLAST EP NC 702 propylene-butene-ethylene terpolymer and VESTOPLAST 608 propylene-butene-ethylene terpolymer, and include combinations thereof.

Process

The modified propylene-alpha-olefin polymer is prepared by treating at least one propylene-alpha-olefin polymer with a free radical initiator at an elevated temperature. The treatment alters the weight average molecular weight and the z average molecular weight of the propylene-alpha-olefin polymer and causes a decrease in the melt viscosity of the propylene-alpha-olefin polymer.

Useful free-radical initiators include, e.g., peroxide type compounds, azo-type compounds, and mixtures thereof. Examples of suitable peroxide compounds include diacyl peroxides, peroxy esters, peroxy ketals, di-alkyl peroxides, and hydroperoxides, specifically hydrogen peroxide, benzoyl peroxide, deconoyl peroxide, lauroyl peroxide, succinic acid peroxide, cumene hydroperoxide, t-butylhydroperoxide, t-butyl peroxy acetate, 2,2 di (t-butyl peroxy) butane di-allyl peroxide), 2,5-dimethyl-2,5-di(tertiarybutyl peroxy) hexane, cumyl peroxide, and combinations thereof. Suitable 2,5-dimethyl-2,5-di(tertiarybutyl peroxy) hexanes are commercially available under the LUPERSOL 101 trade designation from United Initiator Incorporated (Elyria, Ohio).

Examples of suitable azo-type compounds include azobisisobutyronitrile (AIBN), 2,2'-azobis (N,N'-dimethyleneisobutyramide) dihydrochloride (one example of which is commercially available under the VA-044 trade designation from Wako Chemical Co.), 2,2'-azobis(2,4-dimethyl valeronitrile) (one example of which is commercially available under the V-65 trade designation from Wako Chemical Co.), VAZO 64 2,2-azobis(isobutyronitrile) and VAZO 67 2,2'-azobis(2-methylbutyronitrile) both of which are commercially available from du Pont de Nemours and Company (Wilmington, Del.), 1,1'-azobis (1-cyclohexane carbonitrile), acid-functional azo-type initiators e.g., 4,4'-azobis (4-cyanopentanoic acid), and combinations thereof.

The free-radical initiator preferably is present in the reaction mixture in an amount from about 0.005% by weight to about 10% by weight, or even from about 0.1% by weight to about 5% by weight, based on the weight of the propylene-alpha-olefin polymer.

The reaction preferably proceeds at a temperature of from about 150° C. to about 250° C., or even from about 175° C. to about 225° C. The reaction time may vary from less than a minute to several hours depending on the temperature used and the half-life of the free radical initiator being used.

The process can be carried out using any suitable method including, e.g., continuous processes and batch processes.

Suitable continuous processes include, e.g., processes that use extruders (e.g., single screw, twin screw, disk screw, reciprocating single screw, and pin barrel single screw) and processes that use tandem extrusion techniques. Suitable batch processes include, e.g., processes that utilize reaction vessels. Suitable reaction vessels include those made from glass or metal. For example, the reactions may be conducted in glass flasks, glass lined reactors, steel autoclaves, extruders, Brabender plastographs, and Banbury mixers. The reactions may be conducted in the presence of air or under inert gases such as nitrogen. Although not required, it is also possible to carry out the treatment in the presence of an inert solvent such as benzene.

Hot Melt Adhesive Composition

The propylene-alpha-olefin polymer is suitable for use in hot melt adhesive compositions. One useful hot melt adhesive composition includes at least one propylene-alpha-olefin polymer, a first wax that is functionalized, and a second wax. The hot melt adhesive composition exhibits a viscosity of no greater than 2,500 centipoise (cps), no greater than about 2,000 cps, no greater than about 1,500 cps, or even no greater than about 1,000 cps at 177° C. The hot melt adhesive composition also forms a fiber tearing bond at −29° C. and at +60° C., and preferably exhibits at least about 40%, at least about 50%, at least about 80%, or even at least 100% fiber tear at −29° C. and at +60° C.

The hot melt adhesive composition also exhibits a set time of no greater than 15 seconds, no greater than 10 seconds, no greater than 8.5 seconds, no greater than 7 seconds, or even no greater than 5 seconds. The hot melt adhesive composition has a z average molecular weight (Mz) of no greater than 200,000 g/mole, no greater than about 175,000 g/mole, no greater than about 145,000 g/mole, or even no greater than about 120,000 g/mole.

The hot melt adhesive composition preferably has a specific gravity of less than 0.930, less than 0.900, no greater than 0.890, no greater than 0.885, no greater than 0.880, or even no greater than 0.875.

The hot melt adhesive composition preferably is non-tacky at room temperature, but can be formulated to be tacky at room temperature.

The hot melt adhesive composition preferably includes at least 40% by weight, at least about 50% by weight, at least about 60% by weight, at least about 70% by weight, at least about 75% by weight, from about 40% by weight to about 90% by weight, or even from about 60% by weight to about 85% by weight propylene-alpha-olefin polymer.

First Functionalized Wax

Useful functionalized waxes include at least one polar functional group. Examples of useful polar functional groups include alcohol, ketone, aldehyde, acid, anhydride, ester, amine, amide, thiol, and combinations thereof. Useful functionalized waxes include waxes modified with alcohol (e.g., hydrolyzed vinyl acetate), acid (e.g., maleic acid and acrylic acid), anhydride (maleic anhydride), ketone, and combinations thereof. Examples of suitable functionalized waxes include functionalized polypropylene (e.g., maleated polypropylene and oxidized polypropylene), functionalized polyethylene (e.g., maleated polyethylene and oxidized polyethylene), polar waxes, and combinations thereof.

Useful available functionalized waxes include A-C X 1783 maleated polyethylene wax, which is commercially available under the trade designation A-C 577P, and A-C 597P maleated polypropylene wax both of which are from Honeywell International Inc. (Morristown, N.J.), and EPOLENE C-18 maleated branched polyethylene, which is commercially available from Westlake Chemical Corporation (Houston, Tex.).

The hot melt adhesive composition includes at least 0.2% by weight, at least about 1% by weight, no greater than about 40% by weight, no greater than about 30% by weight, no greater than about 20% by weight, no greater than about 10% by weight, or even from about 0.2% by weight to about 3% by weight of the functionalized wax.

Second Wax

Other waxes that are suitable for use in the composition include the functionalized waxes set forth above, non-functionalized waxes, and mixtures thereof. Useful waxes include, e.g., Fischer Tropsch waxes, polyolefin waxes (e.g., polypropylene waxes and polyethylene waxes), benzoate ester waxes, stearamide waxes, functionalized stearamide waxes (e.g., hydroxystearamide, N-(2-hydroxy ethyl)-12-hydroxyoystearamide, and N,N'-ethylene bis 12-hydroxystearamide, and 12-hydroxy stearic acid N,N' ethylene-bis stearamide), paraffin waxes, microcrystalline waxes, metallocene waxes, glycerin monostearate, sorbitan monostearate, and combinations thereof.

The second wax preferably has a melting point of at least about 100° C., a viscosity of from about 20 cps to about 1,000 cps at 140° C., a density of from about 0.90 $g/cm^3$ to about 0.95 $g/cm^3$, and a heat of fusion of at least 70 J/g, at least 85 J/g, or even at least 94 J/g. Some useful waxes have a softening point greater than about 140° C. and a viscosity of from about 20 cps to about 1,000 cps at 190° C. The optional wax can be linear or branched.

Useful commercially available waxes include, e.g., EPOLENE N-21 linear polyethylene wax, which is commercially available from Westlake Chemical Corporation, AC-8 and AC-9 both of which are commercially available from Honeywell International (Morristown, N.J.), and PX105 Fischer-Tropsch wax, which is commercially available from Baker Hughes Incorporated (Houston, Tex.).

The hot melt adhesive composition preferably includes at least 5% by weight, at least about 10% by weight, no greater than about 40% by weight, no greater than about 30% by weight, no greater than about 25% by weight, or even from about 5% by weight to about 30% by weight of the second wax.

Additives

The hot melt adhesive composition optionally includes additional components including, e.g., oil (e.g., aliphatic napthenic oil, white oil, and combinations thereof), antioxidants, additional polymers, tackifying agents, plasticizers (e.g., liquid and solid plasticizers), adhesion promoters, ultraviolet light stabilizers, rheology modifiers, biocides, corrosion inhibitors, dehydrators, colorants (e.g., pigments and dyes), fillers, surfactants, flame retardants, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2, 4-di-tert-butylphenyl)-4,4'-diphenylene-diphosphonite, di-stearyl-3,3'-thiodipropionate (DSTDP), and combinations thereof. Suitable antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol). When present, the adhesive composition preferably includes from about 0.1% by weight to about 2% by weight antioxidant.

Useful additional polymers include, e.g., homopolymers, copolymers, and terpolymers, thermoplastic polymers including, e.g., polyolefins (e.g., polyethylene, polypropylene, metallocene-catalyzed polyolefins, and combinations thereof), elastomers including, e.g., elastomeric block copolymers (e.g., styrene-butadiene-styrene, styrene-isoprene-styrene, styrene-ethylene-butene-styrene, styrene-ethylene-propylene-styrene, metallocene-based elastomeric block copolymers, and combinations thereof), and functionalized versions thereof, and combinations thereof. Examples of suitable commercially available polymers include, e.g., EPOLENE C-15 branched polyethylene, and EPOLENE C-10 branched polyethylene, which are available from Westlake Chemical Corporation (Houston, Tex.).

The optional polymer, when present in the hot melt adhesive composition, is preferably present in an amount no greater than about 10% by weight, no greater than about 5% by weight, no greater than about 3% by weight, or even from about 1% by weight to about 4% by weight.

Useful tackifying agents have Ring and Ball softening point of less than about 140° C., less than about 130° C., or even less than about 100° C. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin, and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin. Examples of useful polyterpene resins include polyterpene resins having a softening point, as determined by ASTM method E28-58T, of from about 10° C. to about 140° C., hydrogenated polyterpene resins, and copolymers and terpolymers of natural terpenes (e.g. styrene-terpene, alpha-methyl styrene-terpene and vinyl toluene-terpene). Examples of useful aliphatic and cycloaliphatic petroleum hydrocarbon resins include aliphatic and cycloaliphatic petroleum hydrocarbon resins having Ring and Ball softening points of from about 10° C. to 140° C. (e.g., branched and unbranched C5 resins, C9 resins, and C10 resins) and the hydrogenated derivatives thereof.

Useful tackifying agents are commercially available under a variety of trade designations including, e.g., the ESCOREZ series of trade designations from Exxon Mobil Chemical Company (Houston, Tex.) including ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including EASTOTAC H-100R, EASTOTAC H-100L, and EASTOTAC H130W, the WINGTACK series of trade designations from Cray Valley HSC (Exton, Pa.) including WINGTACK 86, WINGTACK EXTRA and WINGTACK 95 and the PICCOTAC series of trade designations from Eastman Chemical Company (Kingsport, Tenn.) including, e.g., PICCOTAC 8095.

When a tackifying agent is present in the adhesive composition, the adhesive composition preferably includes no greater than about 50% by weight, no greater than about 40% by weight, no greater than about 30% by weight, no greater than about 20% by weight, no greater than about 10% by weight, at least 1% by weight, at least about 3% by weight, at least about 15% by weight, at least about 20% by weight, from about 1% by weight to about 30% by weight, from about 15% by weight to about 30% by weight, from about 1% by weight to about 20% by weight, or even from about 3% by weight to about 10% by weight tackifying agent.

The composition optionally includes a photoinitiator. Useful photoinitiators are capable of promoting free radical polymerization, crosslinking, or both, of the ethylenically unsaturated moiety on exposure to radiation of a suitable wavelength and intensity. The photoinitiator can be used alone, or in combination with a suitable donor compound or a suitable cointiator. The photoinitiator and the amount thereof are preferably selected to achieve a uniform reaction conversion, as a function of the thickness of the composition being cured, as well as a sufficiently high degree of total conversion so as to achieve the desired initial handling strength (i.e., green strength).

Useful photoinitiators include, e.g., "alpha cleavage type" photoinitiators including, e.g., benzyl dimethyl ketal, benzoin ethers, hydroxy alkyl phenyl ketones, benzoyl cyclohexanol, dialkoxy acetophenones, 1-hydroxycyclohexyl phenyl ketone, trimethylbenzoyl phosphine oxides, methyl thio phenyl morpholino ketones and morpholino phenyl amino ketones; hydrogen abstracting photoinitiators; and combinations thereof.

Useful commercially available photoinitiators are available under the following trade designations IRGACURE 369 morpholino phenyl amino ketone, IRGACURE 819 bis(2,4,6-trimethylbenzoyl)-phenylphosphine oxide, IRGACURE CGI 403 bis(2,6-dimethoxybenzoyl)-(2,4,4-trimethylpentyl) phosphine oxide, IRGACURE 651 benzyl dimethyl ketal, and IRGACURE 184 benzoyl cyclohexanol all of which are available from BASF Corporation (Florham Park, N.J.), DAROCUR 1173 hydroxy alkyl phenyl ketones, DAROCUR 4265 50:50 blend of 2-hydroxy-2-methyl-1-phenylpropan-1-one and 2,4,6-trimethylbenzoyldiphenylphosphine oxide, and CGI1700 25:75 blend of bis(2,6-dimethoxybenzoyl)-2,4,4-trimethylpentylphosphine and 2-hydroxy-2-methyl-1-phenylpropan-1-one, which are available from Ciba-Geigy Corp. (Ardsley, N.Y.)

The photoinitiator is preferably present in an amount sufficient to provide the desired rate of photopolymerization. The amount will depend, in part, on the light source, the thickness of the layer to be exposed to radiant energy and the extinction coefficient of the photoinitiator at the wavelength. Typically, the photoinitiator component will be present in an amount of from about 0.01% by weight to about 5% by weight, more preferably from about 0.1% by weight to about 1% by weight.

Uses

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the aforementioned, clay coated chipboard carton stock, composites, leather, polymer film (e.g., polyolefin, polyester, metalized polymer films, multi-layer films, and combinations thereof), substrates made from fibers (e.g., virgin fibers, recycled fibers, and combinations thereof), and combinations thereof. Useful composites include, e.g., chipboard laminated to metal foil (e.g., aluminum foil), which optionally can be laminated to at least one layer of polymer film, chipboard bonded to film, Kraft bonded to film, and combinations thereof.

The hot melt adhesive composition is useful for forming adhesive bonds in a variety of articles including, e.g., bags (e.g., multiwall bags), boxes, cartons, trays, cases, articles that include attachments (e.g., straws attached to drink boxes), ream wrap, cigarettes (e.g., plug wrap), filters (e.g., filter pleating and filter frames), and combinations thereof.

The hot melt adhesive composition is also useful in bonding a first substrate to a second substrate e.g. as in the lamination of porous substrates and polymer film such as those used in the manufacture of disposable articles including, e.g., medical drapes, medical gowns, sheets, feminine hygiene articles, diapers, adult incontinence articles, absorbent pads (e.g., for animal pads (e.g., pet pads) and humans (e.g., bodies and corpses)) and on a variety of substrates including, e.g., porous substrates (e.g., nonwoven webs and perforated films), film (e.g., polymer films (e.g., polyethylene, polypropylene, polyvinylidene chloride, ethylene vinyl acetate, and polyester films), and combinations thereof.

The hot melt adhesive composition can be applied to a substrate in any useful form including, e.g., a coating (e.g., a continuous or discontinuous coating), a film (e.g., a continuous or discontinuous film), in a pattern (a spray pattern), randomly, and combinations thereof, using any suitable application method including, e.g., slot coating, spray coating (e.g., spiral spray, random spraying, and random fiberization (e.g., melt blowing)), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, and combinations thereof.

In some embodiments, hot melt adhesive composition is radiation curable. For radiation curable hot melt adhesive compositions, the composition can be cured using radiation from a variety of sources including, e.g., Ultraviolet light (i.e., UV), electron beam, and combinations thereof. The radiation curable hot melt adhesive composition can be exposed to radiation at any suitable point including, e.g., simultaneously with coating the composition, after coating the composition (e.g., after coating the composition on a first substrate and prior to contacting the composition with a second substrate), after contacting the coated composition with a substrate, and combinations thereof.

The invention will now be described by way of the following examples. All parts, ratios, percents and amounts stated in the Examples are by weight unless otherwise specified.

EXAMPLES

Test Procedures

Test procedures used in the examples include the following.

Glass Transition Temperature (Tg), Melt Temperature (Tm) Test Method

Glass Transition Temperature (Tg) and Melt Temperature (Tm) are determined using differential scanning calorimetry (DSC) according to ASTM E-793-01 entitled, "Standard Test Method for Heats of Fusion and Crystallization by Differential Scanning calorimetry," using the following conditions: heating the sample to 160° C., holding for 5 minutes at 160° C., quench cooling to −60° C., and then heating from −60° C. to 160° C. at a rate of 10° C. per minute. The results are reported in degrees Celsius (° C.).

Heat of Fusion Test Method

Heat of fusion (ΔH) is determined using differential scanning calorimetry according to ASTM E794-85, entitled, "Standard Test Method for Melting and Crystallization Temperatures by Thermal Analysis" (1985). The results are reported in Joules/gram (J/g).

Crystallization Test Method

Crystallization is determined using differential scanning calorimetry according to the method described in U.S. Pat. No. 7,521,507, column 26, lines 8-27, and incorporated herein.

Method for Determining Molecular Weight

Molecular weights (Mn, Mw, and Mz) are determined using a Polymer Labs PL-GPC 220 High Temperature Size Exclusion Chromatograph (HT-SEC) operating at 160° C. with 1,2,4-trichlorobenzene (TCB) as the mobile phase. The system contains three PL-gel mixed B columns in series and is equipped with a Refractive Index (RI) detector. The SEC operates at a flow rate of 1.0 ml/min with an injection volume of 100 μL. All HT-SEC samples are prepared with a concentration of 4.0 mg/ml. Molecular weights are calculated from the Mark-Houwink relation using known polystyrene and polypropylene standards. For polystyrene the Mark-Houwink parameters are K=0.000121 and α=0.707; for polypropylene the Mark-Houwink parameters are K=0.000190 and α=0.725. The results are reported in grams/mole (g/mole)

Method for Determining Viscosity

Viscosity is determined in accordance with ASTM D-3236 entitled, "Standard Test Method for Apparent Viscosity of Hot Melt Adhesives and Coating Materials," (Oct. 31, 1988) using a Brookfield Thermoset Viscometer Model RVDV 2+ and an appropriate spindle. The results are reported in centipoise ("cps").

Fiber Tear Test Method

The percentage fiber tear is the percentage of fiber that covers the area of the adhesive after two substrates, which have been previously bonded together through the adhesive, are separated by force. The percentage of fiber tear is determined as follows. A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. The resulting construction is then conditioned at the specified test temperature for at least 24 hours. The substrates of the construction are then separated from one another by pulling the two substrates apart from one another by hand. The surface of the adhesive composition is observed and the percent of the surface area of the adhesive composition that is covered by fibers is determined and recorded. A minimum of five samples are prepared and tested for each hot melt adhesive composition.

Set Time Test Method

A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. A timer is started as the bead is applied to the first substrate. When the timer is at 5 seconds, the now formed bond is pulled apart. If the bond results in less than 100% fiber failure, another bond is made and pulled after 5.5 seconds. In this manner, one continues to increase the time, prior to pulling the bond, in 0.5 second increments until the set time is arrived upon. The set time is the shortest amount of time in which a pulled bond results in 100% fiber failure. Once a set time is achieved, the test is repeated one more time to confirm the result. If the bond gives 100% fiber failure at 5 seconds, the set time is recorded as no greater than 5 seconds.

Method for Determining Room Temperature Specific Gravity

Specific gravity is determined at room temperature according to the following method. The specific gravity of the isopropanol test solution is determined. A molten hot melt sample composition is poured into the form of three small puddles weighing 1 gram each. The poured sample is observed to confirm that it is well blended and free of air bubbles. If it is well blended and free of air bubbles the method is continued for that sample. The sample is allowed to cool completely. The samples are weighed to four decimal places and the value is recorded as the weight of the sample in air.

A wire support plate that includes a rectangular wire hoop is placed on a balance pan. The wire support plate includes a metal plate of a size that is capable of resting on the balance pan. The wire hoop is attached to opposite edges of the wire support plate on the same face of the plate and extends up approximately 8 inches from the base of the plate. A metal bridge stand that is able to straddle the balance pan without touching it is put through the wire hoop on the support plate to bridge balance pan. A beaker filled with isopropanol is centered on the wire support plate. The specific gravity of the isopropanol is recorded. A small hook is then hung on the top of the wire hoop so it hangs down into the isopropanol in the beaker. The balance is then zeroed. The hook is then removed and the end of the hook is slightly heated using a lighter. The heated end of the hook is pressed into the sample to attach the sample to the hook, and the hook is again hung from the wire hoop in such a way that the hot melt sample is completely submerged in the isopropanol. After approximately five seconds the weight is observed and recorded, to four decimal places, as the weight of the sample in isopropanol. The specific gravity (SG) is determined using the following equation.

Specific Gravity (SG) of the sample=[SG of the isopropanol×weight of the sample weight in air (g)]/[(weight of the sample in air (g))−(the weight of the sample in isopropanol (g))]

The method is repeated for each sample and the average result is reported.

Controls 1-7

Controls 1-7 were the following copolymers: Control 1, 97% by weight propylene-3% by weight ethylene copolymer having a viscosity of 1500 cps at 190° C.; Control 2, 85% by weight propylene 15% by weight ethylene copolymer having a viscosity of 3,500 at 190° C.; Control 3, 85% by weight propylene 15% by weight ethylene copolymer having a viscosity of 8,500 cps at 190° C.; Control 4, 65% by weight propylene-35% by weight butene copolymer having a viscosity of 8,000 cps at 190° C., Control 5, 60% by weight propylene 40% by weight butene copolymer having a viscosity of 8,000 cps at 190° C.; Control 6, 65% by weight propylene-35% by weight butene copolymer having a viscosity of 8,500 cps at 190° C.; and Control 7, 65% by weight propylene-35% by weight butene copolymer having a viscosity of 6,500 cps at 190° C.

Modified Propylene-Alpha-Olefin Copolymer (MC) 1

Modified propylene-alpha-olefin copolymer 1 was prepared by adding 2.99% by weight (based on the weight of the control polymer) of 20% DHBP 20-IC5 2,5-dimethyl-2,5-di(t-butylperoxy)hexane to Control polymer 1 with mixing at a melt temperature of about 190° C. over a period of about 95 minutes. The mixture was then mixed for an additional 65 minutes.

Modified Propylene-Alpha-Olefin Copolymer 2

Modified propylene-alpha-olefin copolymer 2 was prepared by adding 1.49% by weight (based on the weight of the control polymer) 20% DHBP 20-IC5 2,5-dimethyl-2,5-di(t-butylperoxy)hexane to Control polymer 1 with mixing at a melt temperature of from about 170° C. to about 187° C. over a period of about 65 minutes. The mixture was then mixed for an additional 95 minutes.

Modified Propylene-Alpha-Olefin Copolymer 3

Modified propylene-alpha-olefin copolymer 3 was prepared by adding 0.4% by weight (based on the weight of the control polymer) 20% DHBP 20-IC5 2,5-dimethyl-2,5-di(t-butylperoxy)hexane to Control polymer 1 with mixing at a melt temperature of from about 172° C. to about 182° C. over a period of about 40 minutes. The mixture was then mixed for an additional 110 minutes.

Modified Propylene-Alpha-Olefin Copolymer 4

Modified propylene-alpha-olefin copolymers was prepared by adding 1.49% by weight (based on the weight of the control polymer) of 20% DHBP 20-IC5 2,5-dimethyl-2,5-di(t-butylperoxy)hexane to Control polymer 1 with mixing at a melt temperature of about 180° C. over a period of about 50 minutes. The mixture was then mixed for an additional 90 minutes.

Modified Propylene-Alpha-Olefin Copolymer 5

Modified propylene-alpha-olefin copolymer 5 was prepared by adding 2.99% by weight (based on the weight of the control polymer) 20% DHBP 20-IC5 2,5-dimethyl-2,5-di(t-butylperoxy)hexane to Control polymer 2 with mixing at a melt temperature of about 195° C. over a period of about 90 minutes. The mixture was then mixed for an additional 60 minutes.

Modified Propylene-Alpha-Olefin Copolymer 6

Modified propylene-alpha-olefin copolymer 6 was prepared by adding 2.99% by weight (based on the weight of the control polymer) 20% DHBP 20-IC5 2,5-dimethyl-2,5-di(t-butylperoxy)hexane to Control polymer 3 with mixing at a temperature of from about 188° C. to about 215° C. over a period of about 100 minutes. The mixture was then mixed for an additional 50 minutes.

Modified Propylene-Alpha-Olefin Copolymer 7

Modified propylene-alpha-olefin copolymer 7 was prepared by adding 1A9% by weight (based on the weight of the control polymer) 20% DHBP 20-IC5 2,5-dimethyl-2,5-di(t-butylperoxy)hexane to Control polymer 4 with mixing at a melt temperature of from about 175° C. to about 190° C. over a period of about 60 minutes. The mixture was then mixed for an additional 60 minutes.

Modified Propylene-Alpha-Olefin Copolymer 8

Modified propylene-alpha-olefin copolymer 7 was prepared by adding 1.49% by weight (based on the weight of the control polymer) LUPRESOL 2,5-dimethyl-2,5-di(t-butylperoxy)hexane to Control polymer 5 with mixing at a melt temperature of from about 173° C. to about 185° C. over a period of about 55 minutes. The mixture was then mixed for an additional 95 minutes.

Modified Propylene-Alpha-Olefin Copolymer (MC) 9

Modified propylene-alpha-olefin copolymer 9 was prepared by adding 3.4% by weight (based on the weight of the control polymer) of 20% DHBP 20-IC5 2,5-dimethyl-2,5-di(t-butylperoxy)hexane to Control polymer 6 with mixing at a melt temperature of about 180° C. over a period of about 65 minutes. The mixture was then mixed for an additional 50 minutes, after which a vacuum was pulled for 12 minutes.
Modified Propylene-Alpha-Olefin Copolymer 10

Modified copolymer 10 was prepared by combining Control polymer 7 with 1.5% by weight LUPRESOL 101 organic peroxide (United Initiator Incorporated, Elyria, Ohio) in an extruder at a temperature of 400° F. (204.4° C.) and a residence time of 90 seconds.

The Mn, Mw, Mz, Mw/Mn, Mz/Mn, and Mz/Mw of modified propylene-alpha-olefin copolymers 1-10 were determined and the results are set forth in Table 1. The Tg, Tm, Af, and viscosity of modified propylene-alpha-olefin copolymers 1-10 were determined and the results set forth in Table 2.

TABLE 1

| Sample | Mn | Mw | Mz | PDI | Mz/Mn | Mz/Mw |
|---|---|---|---|---|---|---|
| Control 1 | 1950 | 32,500 | 240,000 | 16.7 | 123.1 | 7.4 |
| MC 1 | 2290 | 20,200 | 73,400 | 8.9 | 32.1 | 3.6 |
| MC 2 | 2600 | 25,300 | 140,000 | 9.7 | 53.8 | 5.5 |
| MC 3 | 2750 | 28,100 | 174,000 | 10.2 | 63.3 | 6.2 |
| MC 4 | N.M. | N.M. | N.M. | N.M. | N.M. | N.M. |
| Control 2 | 3140 | 37,200 | 208,000 | 11.9 | 66.2 | 5.6 |
| MC 5 | 2720 | 25,500 | 68,500 | 9.4 | 25.2 | 2.7 |
| Control 3 | 3520 | 45,870 | 201,000 | 13.0 | 57.1 | 4.4 |
| MC 6 | 3360 | 29,400 | 73,200 | 8.0 | 21.8 | 2.5 |
| Control 4 | 4880 | 55,600 | 233,000 | 11.4 | 47.7 | 4.2 |
| MC 7 | 4360 | 34,100 | 109,000 | 7.8 | 25.0 | 3.2 |
| Control 5 | 4390 | 57,600 | 232,000 | 13.1 | 52.8 | 4.0 |
| MC 8 | 4720 | 37,000 | 102,000 | 7.8 | 21.6 | 2.8 |
| Control 6 | 3420 | 45,200 | 154,000 | 13.2 | 45.0 | 3.4 |
| MC 9 | N.M. | N.M. | N.M. | N.M. | N.M. | N.M. |
| Control 7 | 2610 | 39,100 | 145,000 | 15.0 | 55.6 | 3.7 |
| MC 10 | 3590 | 28,600 | 83,900 | 8.0 | 23.4 | 2.9 |

N.M. = not measured

TABLE 2

| Sample | Tg (° C.) | Tm (° C.) | ΔH (J/g) | Viscosity, 177° C. (cP) | Viscosity, 190° C. (cP) |
|---|---|---|---|---|---|
| Control 1 | −22 | 147 | 20.4 | N.M. | 1500 |
| MC 1 | −22 | 147 | 20.6 | 590 | N.M. |
| MC 2 | −23 | 147 | 21.9 | 1150 | N.M. |
| MC 3 | N.M. | N.M. | N.M. | 1575 | N.M. |
| MC 4 | N.M. | N.M. | N.M. | 1055 | N.M. |
| Control 2 | −39 | 124 | 4.9 | N.M. | 3500 |
| MC 5 | −37 | 150 | 8.7 | 1450 | N.M. |
| Control 3 | N.M. | 125 | 7.2 | N.M. | 8500 |
| MC 6 | −38 | 150 | 12.8 | 2650 | N.M. |
| Control 4 | −25 | N.M. | 0 | N.M. | 8000 |
| MC 7 | −25 | N.M. | 0 | 2330 | N.M. |
| Control 5 | −26 | 98 | 29.2 | N.M. | 8000 |
| MC 8 | −26 | 98 | 26.1 | 3030 | N.M. |
| Control 6 | −24 | 103 | 24.4 | N.M. | 8800 |
| MC 9 | N.M. | N.M. | N.M. | 1028 | N.M. |
| Control 7 | −23 | 104 | 23.2 | 7500 | 5400 |
| MC 10 | −26 | 95 | 20.6 | 1570 | N.M. |

Examples 1-7

Hot melt adhesive compositions of Examples 1-7 were prepared by combining, with mixing, 1.0% by weight IRGAFOS 168 antioxidant, 0.5% by weight IRGANOX 1010 antioxidant, and the ingredients and amounts thereof set forth in Table 3 at a temperature of 177° C.
Control 10

Control 10 was prepared in the same manner as the Examples 1-7 and includes the components specified in Table 3.

The compositions of Examples 1-7 and Control 10 were tested according to at least one of the Viscosity, Set Time, and Fiber Tear at −29° C., 22° C. and 60° C. test methods, and the Method of Determining Room Temperature Specific Gravity, and the results are reported in Table 4.

Examples 1, 2, 5, 6 and Control 10 were tested according to the Method of Determining Room Temperature Specific Gravity using isopropanol having a specific gravity of 0.785 as the isopropanol test solution.

TABLE 3

| Sample | Polymer | Polymer % by Weight | MAPP[1] % by Weight | PE[2] % by Weight | Tackifying Resin[3] % by Weight |
|---|---|---|---|---|---|
| Example 1 | MC 8 | 76.5 | 2 | 20 | 0 |
| Example 2 | MC 8 | 88.5 | 2 | 8 | 0 |
| Example 3 | MC 8 | 83.5 | 5 | 5 | 5 |
| Example 4 | MC 4 | 83.5 | 5 | 5 | 5 |
| Example 5 | MC 5 | 83.5 | 5 | 5 | 5 |
| Example 6 | MC 7 | 78.5 | 5 | 5 | 10 |
| Example 7 | MC 10 | 76.5* | 0 | 20 | 0 |
| Control 10 | MC 10 | 76.5** | 0 | 20 | 0 |

[1] = AC596 maleated polypropylene wax
[2] = N21 polyethylene wax
[3] = EASTOTAC H130W
*contains 2% AC597 maleated polypropylene wax
**contains 2% AC1089 polypropylene wax

TABLE 4

| Sample | Viscosity at 177° C. (cP) | Set Time (seconds) | Fiber Tear −29° C. | Fiber Tear 22° C. | Fiber Tear 60° C. | Specific Gravity |
|---|---|---|---|---|---|---|
| Example 1 | 880 | 5.5 | 80 | N.M. | 100 | 0.883 |
| Example 2 | 895 | 5.5 | 58 | N.M. | 78 | 0.882 |
| Example 3 | 840 | 6.5 | 58 | N.M. | 100 | N.M. |
| Example 4 | 835 | 8.8 | 48 | N.M. | 100 | N.M. |
| Example 5 | 1100 | 12 | 100 | N.M. | 58 | 0.870 |
| Example 6 | 1646 | 10 | 88 | N.M. | 50 | 0.880 |
| Example 7 | 1020 | 6 | 96 | 100 | 52 | N.M. |
| Control 10 | N.M. | 5.5 | 20 | 96 | 18 | N.M. |

All patents and references referred to herein are incorporated herein. Other embodiments are within the claims.

What is claimed is:

1. A hot melt adhesive composition comprising:
a propylene-mono-alpha-olefin polymer having a ratio of weight average molecular weight (Mw) to number average molecular weight (Mn) (Mw/Mn) of at least 6, z average molecular weight (Mz) to Mw (Mz/Mw) from greater than 2.5 to no greater than 6, and a crystallinity of at least 5%;
at least 1% by weight of a first wax consisting of a functionalized wax;
and
a second wax different from the first wax,
the adhesive composition
exhibiting a viscosity of no greater than 2,500 centipoise at 177° C. and at least 40% fiber tear at 60° C., and
having a z average molecular weight (Mz) of no greater than 120,000.

2. A hot melt adhesive composition comprising:
a propylene-alpha-olefin polymer comprising at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw)

from greater than 2.5 to no greater than 6, a crystallinity of at least 5%, and a viscosity of no greater than 2,500 centipoise at 190° C.;

at least 1% by weight of a first wax consisting of a functionalized wax; and a second wax different from the first wax, the adhesive composition exhibiting a viscosity of no greater than 2,500 centipoise at 177° C.

3. The adhesive composition of claim 2, wherein the propylene-alpha-olefin polymer comprises a propylene-butene copolymer.

4. The hot melt adhesive composition of claim 2, wherein the propylene-mono-alpha-olefin polymer comprises a modified propylene-mono-alpha-olefin polymer comprising the reaction product of another propylene-mono-alpha-olefin copolymer and a free radical initiator.

5. The hot melt adhesive composition of claim 2, wherein the adhesive composition forms a fiber tearing bond at −29° C. and at 60° C.

6. The adhesive composition of claim 2, wherein the adhesive composition exhibits at least 50% fiber tear at −29° C. and at 60° C.

7. The adhesive composition of claim 2, wherein the adhesive composition exhibits a set time of no greater than 15 seconds.

8. The adhesive composition of claim 2, wherein the adhesive composition exhibits a set time of no greater than 10 seconds.

9. The hot melt adhesive composition of claim 2, wherein the adhesive composition has a Mz of no greater than 120,000.

10. The hot melt adhesive composition of claim 2, wherein the propylene-alpha-olefin polymer has a Mz of no greater than 150,000.

11. The hot melt adhesive composition of claim 2, wherein the propylene-alpha-olefin polymer is derived from propylene and a mono-alpha-olefin.

12. The hot melt adhesive composition of claim 2, wherein the propylene-alpha-olefin polymer is derived from propylene and an alpha-olefin selected from the group consisting of ethylene, butene, pentene, hexene, heptene, octene, nonene, decene, dodecene, 4-methyl-pentene-1, 3-methyl pentene-1, 3,5,5-trimethyl-hexene-1, 5-ethyl-l-nonene, and combinations thereof.

13. The adhesive composition of claim 2, wherein the propylene-alpha-olefin polymer is derived from a propylene-alpha-olefin polymer having an Mz of at least 200,000.

14. The adhesive composition of claim 2, wherein the propylene-alpha-olefin polymer is derived from a propylene-alpha-olefin polymer having a viscosity no greater than about 10,000 centipoise at 190° C.

15. The adhesive composition of claim 2, wherein the polymer has a heat of fusion of no greater than 30 J/g.

16. The adhesive composition of claim 2, wherein the polymer has a heat of fusion of no greater than 20 J/g.

17. The adhesive composition of claim 2 having a viscosity of no greater than about 2,000 centipoise at 177° C.

18. The adhesive composition of claim 2, wherein the polymer has a Tg of less than −20° C.

19. The adhesive composition of claim 2, wherein the functionalized wax comprises maleic anhydride functionalized wax.

20. The adhesive composition of claim 2, wherein the functionalized wax comprises maleic anhydride functionalized polyolefin wax.

21. The adhesive composition of claim 2, wherein the functionalized wax comprises maleic anhydride functionalized polypropylene wax.

22. The adhesive composition of claim 2, wherein the second wax is selected from the group consisting of polyethylene wax, polypropylene wax, and Fischer Tropsch wax.

23. The adhesive composition of claim 2, wherein the functionalized wax comprises maleic anhydride functionalized polypropylene wax and the second wax comprises polyethylene wax.

24. The adhesive composition of claim 23 further comprising a Fischer Tropsch wax.

25. The adhesive composition of claim 2 comprising at least about 60% of the propylene-alpha-olefin polymer.

26. The adhesive composition of claim 2 comprising at least about 70% of the propylene-alpha-olefin polymer.

27. The adhesive composition of claim 2, wherein the Mz/Mw is no greater than 5.

28. The adhesive composition of claim 2, wherein the Mz is no greater than 100,000.

29. The hot melt adhesive composition of claim 2 2, wherein the adhesive composition is free of tackifying agent.

30. A hot melt adhesive composition comprising:
a modified propylene-mono-alpha-olefin polymer comprising the reaction product of a propylene-mono-alpha-olefin polymer and a free radical initiator, the propylene-mono-alpha-olefin polymer having a Mz/Mn of greater than 45, a Mz/Mw of greater than 3.2, and a viscosity of from at least 1,000 centipoise to no greater than 10,000 centipoise at 190° C.;
at least 1% by weight of a first wax consisting of a functionalized wax; and
a second wax different from the first wax,
the adhesive composition exhibiting a viscosity of no greater than 2,500 centipoise at 177° C. and an Mz no greater than 120,000.

31. The hot melt adhesive composition of claim 30, wherein the propylene-mono-alpha-olefin polymer has an Mz of at least 140,000.

32. A method of making a hot melt adhesive composition comprising:
combining a propylene-alpha-olefin polymer comprising at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw) from greater than 2.5 to no greater than 6, a crystallinity of at least 5%, and a viscosity of no greater than 2,500 centipoise at 190° C.,
at least 1% by weight of a first wax consisting of a functionalized wax, and
a second wax different from the first wax,
the adhesive composition exhibiting a viscosity of no greater than 2,500 centipoise at 177° C.

33. The adhesive composition of claim 2 comprising no greater than about 30% by weight non-functionalized wax.

34. The adhesive composition of claim 2 comprising
at least about 60% of the propylene-alpha-olefin polymer,
at least about 2% of the functionalized wax, and
at least about 5% of the second wax.

35. The adhesive composition of claim 2 further comprising
a tackifying agent.

36. The adhesive composition of claim 35 comprising at least 15% by weight tackifying agent.

37. The adhesive composition of claim 35 comprising from 15% by weight to about 30% by weight tackifying agent.

38. A hot melt adhesive composition comprising:

a propylene-alpha-olefin polymer comprising at least 50 mole % propylene, a ratio of z average molecular weight (Mz) to number average molecular weight (Mn) (Mz/Mn) from greater than 20 to no greater than 50, a ratio of Mz to weight average molecular weight (Mw) (Mz/Mw) from greater than 2.5 to no greater than 6, a crystallinity of at least 5%, and a viscosity of no greater than 2,500 centipoise at 190° C.;

a first wax consisting of a functionalized wax; and at least 5% by weight of a second wax different from the first wax, the adhesive composition exhibiting a viscosity of no greater than 2,500 centipoise at 177 ° C.

39. The adhesive composition of claim 38 comprising at least about 10% by weight of the second wax.

\* \* \* \* \*